United States Patent
Maitland (10) Patent No.: US 8,655,381 B2
(45) Date of Patent: Feb. 18, 2014

(54) METHOD AND APPARATUS FOR MERCHANT SEARCH AND OFFER PRESENTATION

(75) Inventor: Jill Maitland, Rye Brook, NY (US)

(73) Assignee: MasterCard International Incorporated, Purchase, NY (US)

( * ) Notice: Subject to any disclaimer, the term of this patent is extended or adjusted under 35 U.S.C. 154(b) by 616 days.

(21) Appl. No.: 12/053,709

(22) Filed: Mar. 24, 2008

(65) Prior Publication Data

US 2008/0268868 A1    Oct. 30, 2008

Related U.S. Application Data

(60) Provisional application No. 60/896,532, filed on Mar. 23, 2007.

(51) Int. Cl.
*H04W 24/00* (2009.01)

(52) U.S. Cl.
USPC ........... 455/456.3; 455/456.1; 455/456.2; 455/456.5; 705/14.25; 705/14.64; 705/14.66

(58) Field of Classification Search
None
See application file for complete search history.

(56) References Cited

U.S. PATENT DOCUMENTS

| | | | |
|---|---|---|---|
| 7,792,709 B1* | 9/2010 | Trandal et al. | 705/26 |
| 2002/0013815 A1* | 1/2002 | Obradovich et al. | 709/204 |
| 2002/0188562 A1* | 12/2002 | Igarashi et al. | 705/40 |
| 2004/0098377 A1* | 5/2004 | Kraft | 707/3 |
| 2006/0074769 A1* | 4/2006 | Looney et al. | 705/26 |
| 2006/0212355 A1* | 9/2006 | Teague et al. | 705/14 |
| 2007/0244741 A1* | 10/2007 | Blume et al. | 705/10 |
| 2008/0033635 A1* | 2/2008 | Obradovich et al. | 701/201 |
| 2008/0065464 A1* | 3/2008 | Klein et al. | 705/10 |
| 2008/0082373 A1* | 4/2008 | Durocher et al. | 705/6 |
| 2008/0172357 A1* | 7/2008 | Rechis et al. | 707/2 |
| 2008/0248815 A1* | 10/2008 | Busch | 455/456.5 |

* cited by examiner

*Primary Examiner* — Suhail Khan (74) *Attorney, Agent, or Firm* — Buckley, Maschoff & Talwalkar LLC (57) ABSTRACT

Systems, methods, apparatus, computer program code, and means for receiving a search request from a user operating a wireless device, determining at least one of a location and a desired search location of the user, determining a search response based on a user profile and the at least one of a location and a desired search location, and transmitting a response to the wireless device. In some embodiments, the response includes at least one of an offer and a display sequence selected based at least in part on the user profile.

18 Claims, 5 Drawing Sheets

METHOD AND APPARATUS FOR MERCHANT SEARCH AND OFFER PRESENTATION

CROSS-REFERENCE TO RELATED APPLICATION

This application claims the benefit of U.S. Provisional Patent Application Ser. No. 60/896,532, filed Mar. 23, 2007, which is incorporated herein in its entirety.

BACKGROUND

Handheld electronic communication devices (such as personal digital assistants or "PDAs", cellular telephones, and the like) are in wide use. Many of these devices allow users to interact with Internet data sources to retrieve data. For example, some cellular telephone users can obtain directory information, maps, and other location based information. Some companies, such as Yahoo!® and Go2®, allow wireless device users to enter search terms and retrieve search results based on their location. For example, a wireless device user can search for a restaurant near Grand Central Station in New York City, and retrieve a list of restaurants and their addresses.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Applicants have recognized a need for systems, methods, apparatus, computer program code, and means for receiving a search request from a user operating a wireless device, determining at least one of a location and a desired search location of the user, determining a search response based on a user profile and the at least one of a location and a desired search location, and transmitting a response to the wireless device. In some embodiments, the response includes at least one of an offer and a display sequence selected based at least in part on the user profile. In some embodiments, the user profile is formed based on the user's transaction history using one or more payment accounts (e.g., such as one or more credit card or debit card accounts). In some embodiments, the user profile is further formed based on the user's transaction characteristics. In some embodiments, the user profile includes at least one customer category.

A number of terms are used herein. These terms are not intended to be limiting but instead are provided for clarity and ease of exposition. For example, the term "mobile device" will be used to refer to a device, such as a cellular or wireless telephone, a PDA, a computer, or the like that is able to communicate wirelessly over a network. The term "payment card" will be used to refer to a payment card account such as a credit card account, a debit card account, and other financial transaction accounts. The term "cardholder" will be used to refer to the individual or entity to whom a "payment card" has been issued.

The term "payment card issuer" is used to refer to the financial institution or entity that issued a "payment card" to a "cardholder" (including providing the cardholder with a physical or electronic card or access device and establishing an account relationship with the cardholder). The term "payment card association" is used to refer to an association, such as MasterCard International or the like, pursuant to whose rules the "payment card" is issued. The term "payment card transaction data" is used to refer to data identifying specific transactions a cardholder has entered into using the payment card. For example, "payment card transaction data" may include data identifying: a transaction amount, a transaction data, a merchant identifier, a merchant category, and the like. As used herein, the term "merchant" is generally used to refer to a provider of goods or services such as a retailer or other location. The term also is used to generically refer to other types of locations (for example, the term as used herein encompasses other items a user may desire to search for—such as an automated teller machine or "ATM", a library, a governmental office, a tourist destination, etc.).

Prior to presenting a detailed description of features of some embodiments of the present invention, a brief illustrative example may be helpful. In the illustrative example, a user has registered to participate in the system of the present invention. The user is a cardholder of at least one payment card issued pursuant to the rules of a payment card association. In the example, the cardholder has a MasterCard® credit card issued by Chase Manhattan Bank. The cardholder has made a number of purchases using the payment card. This transaction history (and other profile information about the cardholder) indicates that the cardholder is a Male, in the age group 30-45, who frequently uses his payment card for travel and entertainment expenses and, more particularly, uses his payment card at high-end restaurants (e.g., where the average transaction price is greater than $100 or some other threshold).

The cardholder, using a client application on his cellular telephone to interact with the system of the present invention, submits a search request for a restaurant near 1 West $4^{th}$ Street in New York. The system of the present invention receives the search request and consults a number of data sources to retrieve a list of restaurants near the search location that accept MasterCard payment cards for payment. The results are further processed to identify any restaurants having one or more current "offers" or deals available to MasterCard payment card cardholders. The system uses this information, in addition to the cardholder's transaction history and profile information, to select one or more restaurants having offers that may be particularly appealing to the cardholder. In the example, the cardholder's transaction history indicates that the cardholder frequents high-end restaurants.

Restaurants (and offers) matching the cardholder's profile and search location are identified and returned (possibly along with a selection of other restaurants near the search location) and are displayed on the cardholder's cellular telephone. The results may be displayed in a sequence. For example, the first restaurant on the list may be the restaurant nearest the search location that also has an offer. As another example, the first restaurant on the list may be the restaurant that most closely matches the cardholder's profile and that also has an offer available. For example, a high-end restaurant one block from the search location may have a 10% offer to MasterCard cardholders. The offer terms may be presented to the cardholder on the display screen of his cellular phone. If the cardholder wishes to use the offer, he may ask that the offer be sent to his cellular phone as a message (e.g., such as a short message service message or "SMS message") so that he can present an offer code or offer identifier to the restaurant when he patronizes the restaurant.

In this manner, the cardholder is able to perform location-based searches and receive results that are both highly relevant and contain offers that may be of great interest to the cardholder. Merchants are able to target offers and promotions to potential customers who have a current interest in their product (e.g., the customer is currently and actively performing a search for the merchant's location or goods or services), and, in some embodiments, who have demonstrated an interest in their type or quality of the product offered by the merchant. Further features and benefits of some embodiments will become apparent to those skilled in the art upon reading the following detailed description.

Figure 1:
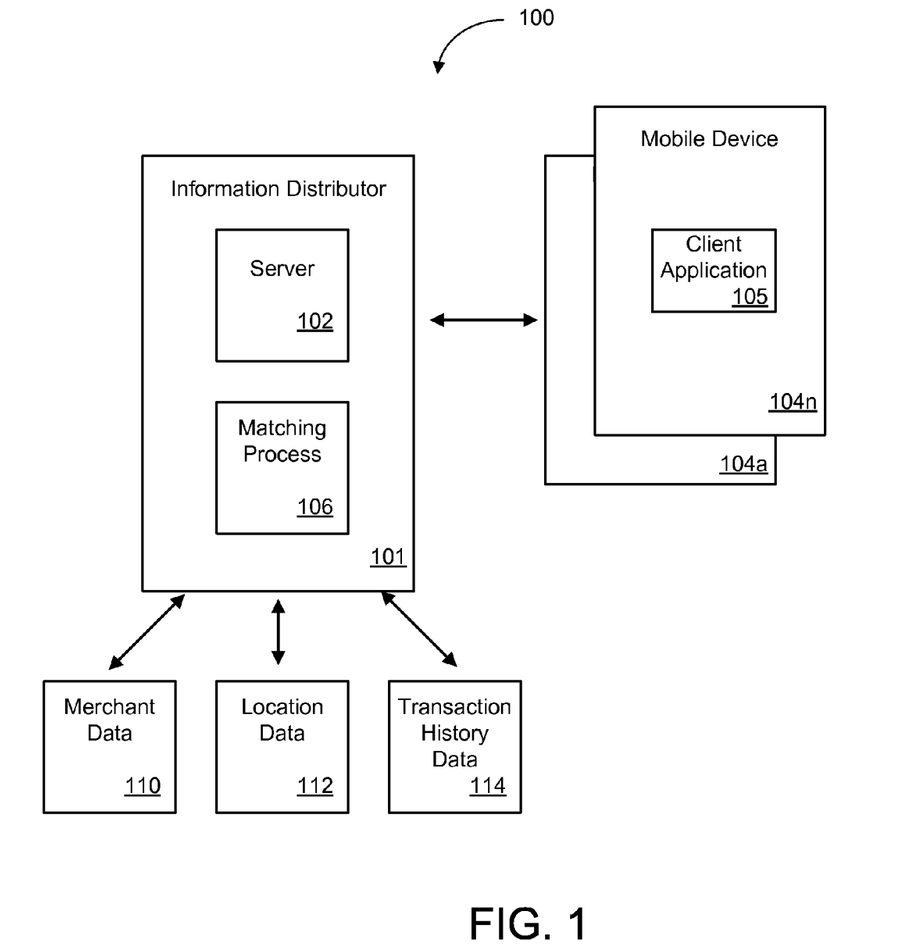
FIG. 1 illustrates a block diagram of a system according to some embodiments.

Now referring to FIG. 1, an embodiment of a system 100 pursuant to some embodiments is shown. The system 100 may comprise an information distributor 101, a plurality of mobile devices 104a-n, and one or more data sources, such as merchant data source 110, location data source 112, and transaction history data source 114. In general, information distributor 101 interacts with mobile devices 104 to receive and process location-based search results and to return search response data based on data from one or more data sources.

The mobile devices 104 may be, but are not limited to, handheld phones or other wireless devices that are capable of communicating over one or more networks with information distributor 101. Each mobile device 104 may include a client application 105 to allow a user of the device to create and submit search requests to information distributor 101. Client application 105 also operates to display any search response data in a readable format for the user. Each mobile device 104 may include an output device and one or more input devices (not shown) allowing a user of the device to submit and view data, including search data associated with the present invention. In some embodiments, one or more of the mobile devices 104 may include positioning technology to allow data identifying a current geographic location of the device to be associated with a search request. For example, one or more of mobile devices 104 may be configured with a Global Positioning System ("GPS") receiver allowing detection of a current location of the device. Other location identification technologies may also be used, such as the enhanced 911 location services currently being adopted in the United States. The client application 105 may be an applet or application that may be downloaded to the device "over the air" or remotely. For example, in some embodiments, the client application 105 may be, but is not limited to, a "WAP" enabled browser or a Java® application or applet. In general, client application 105 includes features allowing submission of search requests to information distributor 101 and receipt and viewing of search responses.

The information distributor may comprise one or more servers (such as server 102), a matching process 106 and communication devices (not shown) allowing communication with (a) a plurality of mobile devices 104a-n, and (b) one or more data sources such as merchant data source 110, location data source 112, and transaction history data source 114. In some embodiments, the information distributor may be, but is not limited to, a system operated by or on behalf of a financial institution, a clearing association, a payment card association, or other service provider interacting with customers and data sources to offer the services described herein. For the purpose of illustrating features of the present invention, throughout the remainder of this disclosure, the entity operating information distributor 101 will be MasterCard International, a payment card association, and the customers operating mobile devices 104a-n will be MasterCard payment cardholders.

The server 102 may communicate with one or more mobile devices 104 through a variety of means such as, but not limited to, a wireless network, a telecom tower, and a satellite. The server 102 may contain one or more processors and may be one or more network servers or computers. The processor or processors may execute instructions stored in the medium (not shown). The medium may be, but is not limited to, one or more disk drive systems, flash memory, firmware, or read only memory. The server 102 may include software programmed to perform matching process 106, or the matching process 106 may be performed on separate server or computer systems (not necessarily owned or controlled by the entity operating information distributor 101). The server 102 may directly or indirectly access the data in external data sources such as data sources 110-114. In some embodiments, one or more of the data sources are operated by third parties not directly associated with the entity operating information distributor 101. For example, the location data source 112 may be operated by an entity offering location-based services, and may expose the data to information distributor 101 through an application programming interface ("API").

In the embodiment depicted in FIG. 1, merchant datasource 110 includes information about particular merchants, including offers made by those merchants to participating users of the system. For example, data in merchant datasource 110 may include the following types of information about each participating merchant: a merchant identifier, a merchant name, a merchant address, one or more merchant category identifiers (such as SIC codes or MCC codes), one or more current offers extended by the merchant, including any terms and conditions of the offers, and, in some embodiments, desired customer characteristics or segments that the offers may be targeted to. Some of this information may be obtained from existing databases (e.g., such as merchant databases created by a payment card association such as MasterCard International). Other information (such as offer data) may be collected directly from participating merchants through a merchant interface (not shown).

Location datasource 112 may include information used to identify a geographic location of a mobile device or a search request based on an entered address, zip code, or latitude and longitude as well as information used to identify a geographic location of a merchant. A number of entities offer location databases that may be suitable for use with embodiments of the present invention. For example, the location-based search databases accessible via www.go2.com, www.google.com and others may be suitable for use with embodiments of the present invention. In some embodiments, some or all of the data of the merchant datasource 110 and location datasource 112 may be combined into a single datasource.

Transaction history datasource 114 may include information associated with individual or aggregate transactions conducted by users of the system. In the illustrative example introduced above, transaction history datasource 114 may include data identifying previous MasterCard payment transactions conducted by participating users. This data may be used, in some embodiments, to segment or "cluster" individual cardholders into groups based on their transaction histories. As a specific illustrative example, cardholders may be segmented or clustered by age group, by transaction size, by preferred merchant category, by spending habits, or the like.

The data retrieved by information distributor 101 to respond to a particular search request received from a mobile device 104 are manipulated by matching process 106 to create a search response message that includes highly relevant data for the user. In some embodiments, matching process 106 is configured to: (a) select merchant locations that are near the search location submitted by the user of mobile device 104, (b) identify relevant offers for those merchants, and (c) organize the selected locations and offers such that a relevant and targeted search response can be presented to the user in a logical manner that makes efficient use of the small display size of a typical mobile device.

Figure 2:
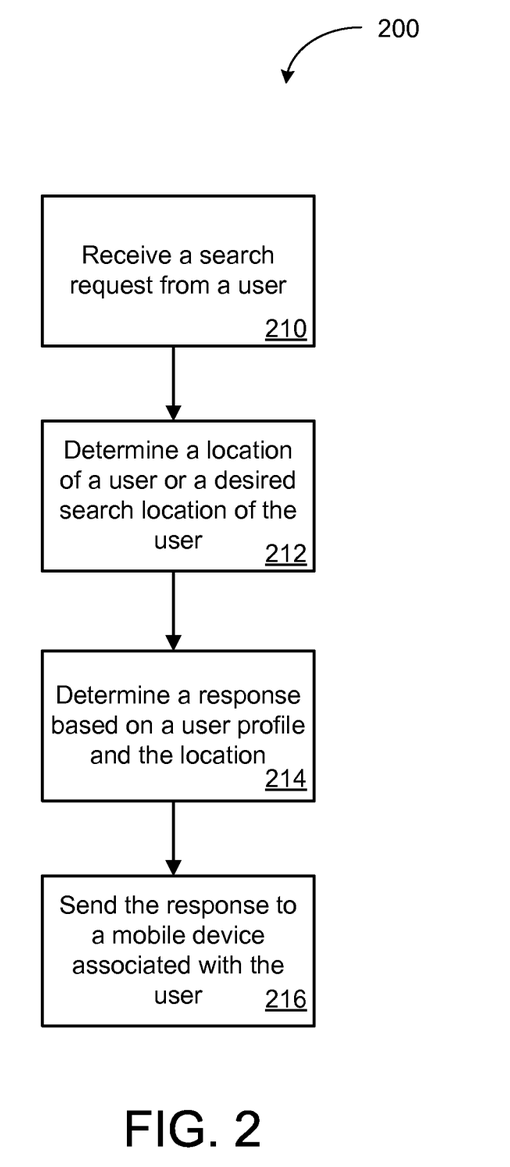
FIG. 2 illustrates a block diagram of a process according to some embodiments.

Now referring to FIG. 2, an embodiment of a process 200 is illustrated. Process 200 may be executed by any combination of hardware, software, and firmware. For example, process 200 may be implemented by server 102 of information distributor 101. Process 200 begins at 210 where a search request is received at information distributor 210. The search request may be initiated by a user operating a mobile device such as mobile device 104 of FIG. 1. In some embodiments, a client application on the user's mobile device 104 provides a user interface (graphical, text, or the like) that allows the user to enter a search request. For example, the search request may be a request for a specific merchant near a location or for a specific category or type of goods or services. The user's interaction with mobile device 104 may be facilitate by a search menu that allows the user to select a type of search. For example, the search menu may prompt the user to search by "category" or by "merchant" or by "offer" in or near a location. The search data is transmitted from mobile device 104 to information distributor 101 over one or more networks, such as a cellular network and/or the Internet.

Processing continues at 212 where a location of the user or a desired search location of the user is determined. In some embodiments, the user's current location may be determined by identifying a location of the mobile device associated with the user. The location of the mobile device may be determined by, but not limited to, a global positioning system ("GPS"), a global positioning satellite, or by triangulating telecom towers. In some embodiments, the location of the user may be determined by stored user information containing one or more locations associated with the user. For example, the user may establish a user profile identifying one or more user locations. Each of the locations may be identified and selected by the user while interacting with the client application on mobile device 104. For example, the user may select to search for merchants near his "home" (where data identifying his home address may be stored in the system and associated with the user's profile or stored in the client application of the user's mobile device 104). In some embodiments, the user may specify a desired search location (e.g., by entering a desired zip code, area code, or street address) when submitting the search request.

Continuing the illustrative example introduced above, the payment cardholder may submit a search request for a restaurant near a particular location. The cardholder may select to search for restaurants near his current physical location (e.g., determined based on location data associated with his cell phone using, for example, GPS location data, e911 data or the like). The cardholder may also pick a prestored location (like "home") or may input information identifying the search location, such as "1 West 4$^{th}$ Street, New York", or search area "Lower West Side, Manhattan". The cardholder may also specify a search distance. For example, the cardholder may request a search of restaurants within ½ mile of the search location.

Upon receipt of this information, information distributor may 101 may determine a response at 214. The response may be based on a profile of the user and the location (or search location) of the user. In some embodiments, the response may include information identifying at least one merchant matching the search request and location. In some embodiments the profile of the user may be a user profile that contains a category preference, browsing habits, transaction history and one or more purchasing profiles, categories or clusters the user may be associated with.

Continuing the illustrative example introduced above, the cardholder is a MasterCard cardholder, and some information about the cardholder's transaction history is made available to the information distributor 101 (e.g., via transaction history datasource 114). For example, the cardholder typically uses his payment card for travel and entertainment expenses and frequents higher-priced restaurants. As such, the cardholder may be generally associated with a high-income or travel and entertainment expense "cluster" of users. As such, when creating a response to the search request, the merchant data (e.g., from merchant datasource 110) matching the search request will be matched with location data (e.g., from location datasource 112) and transaction history data (e.g., from transaction history datastore 114) to select the restaurants that most closely match the cardholder's "cluster", user profile and search location. In some embodiments, any matched merchants that also have offers will be identified. The matching process 106 may sort the results in a ranked order so that when the results are displayed on the display device of the mobile device 104 they the displayed results are most relevant to the cardholder.

Processing continues at 216 where information distributor 101 sends the search response to the mobile device associated with the user who requested the search. In some embodiments, the search results are sent in a compact file format that may easily be parsed and displayed by client application 105 installed on mobile device 104. The data file may include a number of data items, including merchant name, location data, directions from the search location, merchant details, and any offers or discounts currently extended by the merchant to system participants.

Continuing the illustrative example, the top result for the cardholder may be a higher priced Italian restaurant that has a 10% discount offer to MasterCard cardholders (and may not necessarily be a restaurant located exactly at the search address). A cardholder with a different profile, transaction history, or "cluster" would not necessarily receive the same results or the same order of results. In this manner, embodiments ensure targeted delivery of highly relevant and personalized results so that users may quickly make a buying decision despite a large number of merchant matches and the small display size of most mobile devices.

In some embodiments, the user may accept or receive detailed terms of a merchant's offer by requesting an offer code or identifier be sent to the user's mobile device via an SMS message or the like. In this manner, if and when the user patronizes the merchant location, the user can present the offer code or identifier to the merchant to redeem the offer.

Pursuant to some embodiments, a distinction may be made between "registered" and "unregistered" users. For example, in some embodiments, an operator of information distributor 101 of FIG. 1 may allow a wide range of users to perform searches and receive results. However, only registered users (or users who have created a user profile with information distributor 101) may have their search results filtered based on their transaction history. Other features may be made accessible to the registered users but not the unregistered users (for example, a registered user may enjoy the ability to receive offer details in an SMS message, or the ability to view a map with directions to matched merchant locations, etc.). In the illustrative example, the universe of users who can utilize the service without registering may be all MasterCard payment cardholders.

Figure 3:
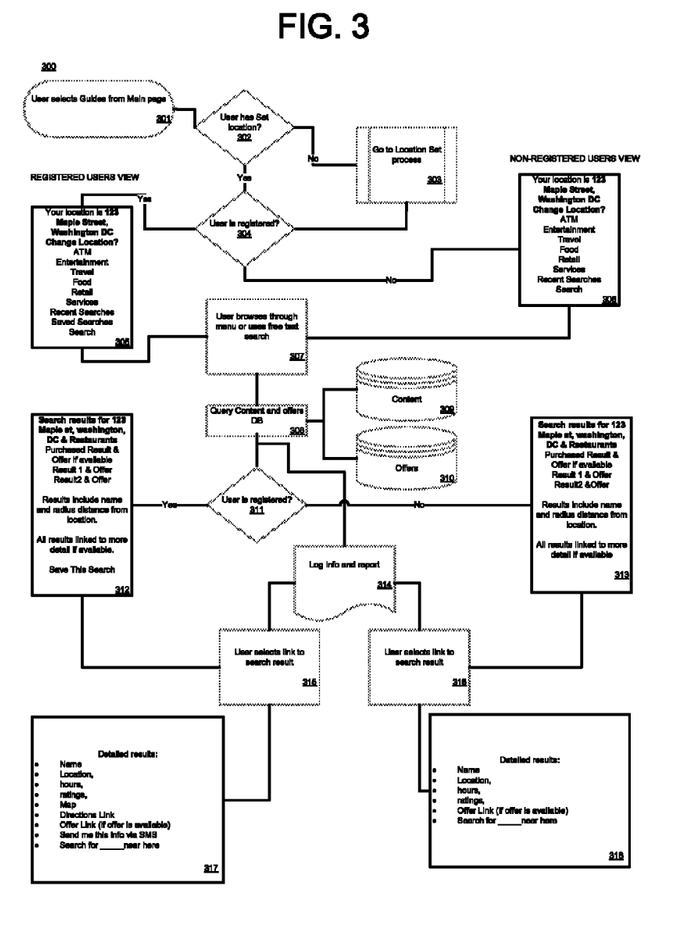
FIG. 3 illustrates a block diagram of a process according to some embodiments.

Referring now to FIG. 3, an embodiment which uses such a distinction between registered users and non-registered users is shown. In particular, a process 300 pursuant to some embodiments is illustrated. Process 300 may be executed by any combination of hardware, software, and firmware, including but not limited to, the system 100 of FIG. 1. Processing begins at 301, where a user interacts with client application 105 on mobile device 104 to selects a search guide from a main menu.

Processing continues at 302, where a determination is made if the user has a set location. If the user has not set a location in the system 100 then a set location process 303 is executed, allowing the user to specify a search location. Processing continues at 304 where a determination is made if the user is a registered user.

If the user is a registered user then the user will be shown, on a display device of his mobile device 104, a first registered users view 305 that may include the user's current location, an option to change their location, one or more links to categories of merchants or items of interest (e.g., "ATM", "Entertainment", "Travel", etc.), links to retrieve any recent searches, links to any saved searches, and a link to initiate a new search. If the user is not a registered user, then the user will be shown, on a display device of his mobile device 104, a first non-registered users view 306 that may include the user's current location, an option to change their location, one or more links to categories of merchants or items of interest (e.g., "ATM", "Entertainment", "Travel", etc.), links to retrieve any recent searches, and a link to initiate a new search. In some embodiments, the displayed choices for a non-registered user may be different than for a registered user.

Processing continues at 307 where the user (registered or non-registered) may interact with the items on the registered users view 305 to browse through categories, saved searches, or the like or to initiate a search. The user may perform these actions using a keypad or touchscreen input device of the user's mobile device 104. When a user is satisfied with his search terms or request, the user causes the search to be submitted to information distributor 101 via one or more networks. The request is received at information distributor 101 and processing continues at 308 where the information distributor 101 causes one or more datasources to be queried to return matching results. For example, in the embodiment depicted, a content datasource 309 and an offer datasource 310 are shown. The content datasource 309 includes, for example, merchant data and location data. In some embodiments, content datasource 309 also includes transaction data or cluster data used to identify transaction characteristics of a registered user.

Processing at 309 includes matching returned content data and offer data for presentation in a search response to the user. In some embodiments, the search response data returned to a registered user (at 312) may be different than the search response data returned to a non-registered user (at 313). For example, at 312 the search response data sent to a registered user includes a list of results and related offers (if any). The results include the merchant or location name and a distance from the search location. The user may access further detailed information about each merchant and each offer, if desired. Further, the registered user may elect to save the search results (while the non-registered user in 313 may not save the results).

As shown at 315 and 316, both a registered and a non-registered user may interact with the search results by selecting one of the results to view more detail (e.g., by operating an input device on the mobile device 104). As shown at 317 and 318, the registered user and non-registered user may see different details. The registered user may view data such as a merchant name, location, hours of operation, merchant ratings, a map of or to the merchant location, a link to obtain detailed directions to the location, a link to offer details (if one or more offers are made by the merchant), an option to have the offer data (including, for example, an offer identifier or code usable to redeem the offer), and an option to perform a free text search for items (such as a merchant name, category, or the like) near the merchant location.

As shown at 316, in some embodiments, the non-registered user may be able to view similar data, but may not be able to perform several actions such as receive an SMS offer, view maps or directions, etc. These differences between a registered and non-registered user are purely for illustration—those skilled in the art will recognize that different offerings may be made to different types of users. Further, other types of classes of users may also be defined (such as standard users, premium users, etc.).

Figure 4:
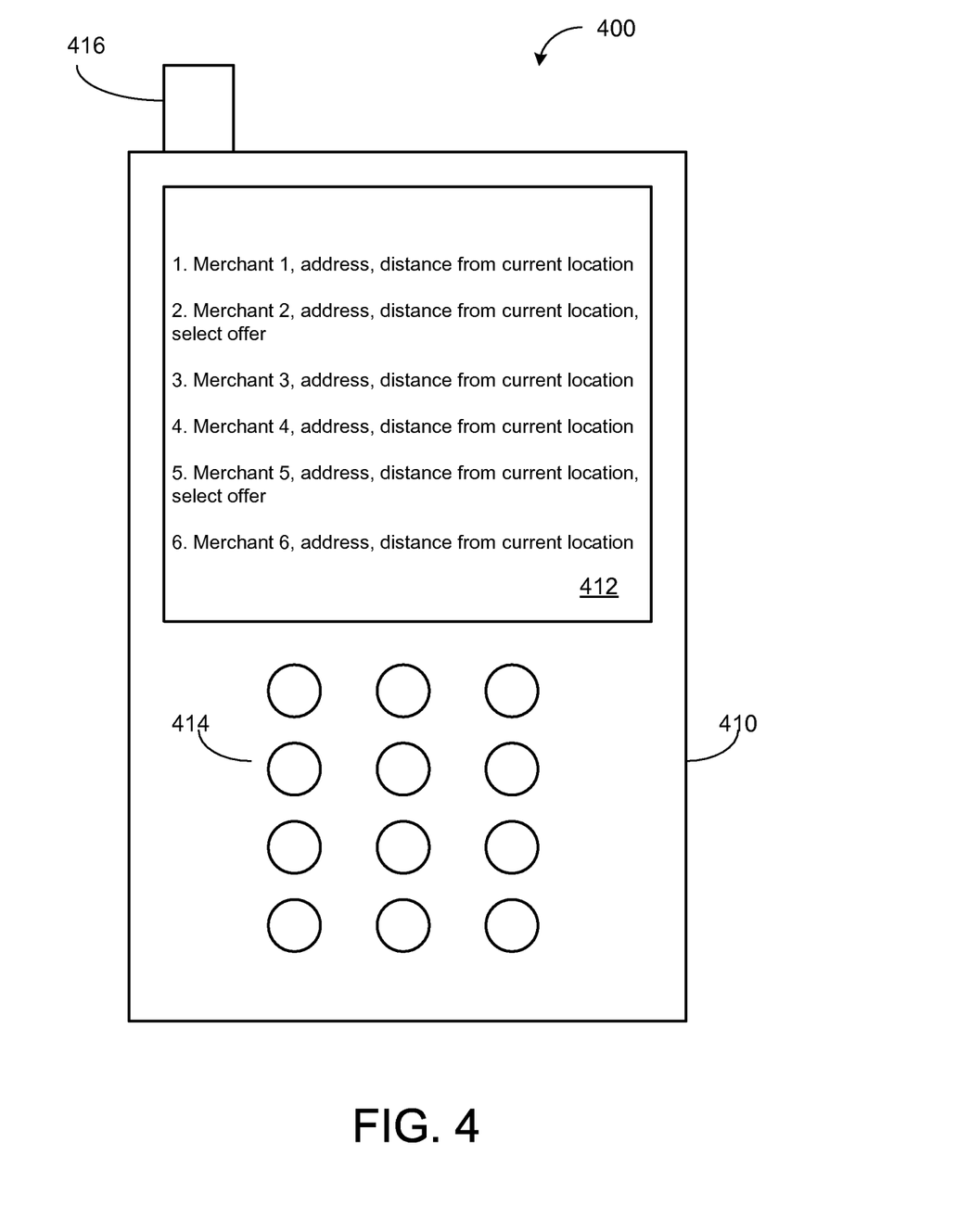
FIG. 4 illustrates a display according to some embodiments.

Referring now to FIG. 4, one illustrative embodiment of a mobile device 400 is shown pursuant to some embodiments. As shown, mobile device 400 includes a housing 410, a display device 412, an input device 414 and an antenna 416. Housing 410 may include a processor and memory and the memory may store a client application (such as the client application 105 discussed in conjunction with FIG. 1 above) configured to control or coordinate operation of display device 412, input device 414 and antenna 416 to allow a user of mobile device 400 to submit search requests over a network to information distributor 101 and view search results returned from information distributor 101 pursuant to the present invention. Mobile device 400 may be configured in any of a number of different ways as known in the art. For example, additional or different input devices may be provided, additional or different housings 410 may be provided, additional or different antennas 416 and display devices 412 may be provided, etc.

As shown, display 412 is displaying sample search response data. In the depicted embodiment, a six merchants have been returned as search results—two of the merchants have offers associated with them. In use, each of the merchant names and related information may be hyperlinks allowing the user to click on or otherwise select the text area to display a new page or display of information associated with the merchant. In some embodiments, as discussed above, the presentation of search results on display device 412 may vary based on the user characteristics or profile. For example, a user whose transaction history with his MasterCard payment card indicates that he is a Male, aged 30-45 who frequently uses his MasterCard for travel and entertainment purchases at high end merchants will receive a different search listing and, possibly, different offers, than would a MasterCard payment cardholder whose transaction history indicates that she is a Female, aged 21-30 who uses her MasterCard payment card for clothing and budget retailers. In this manner, the limited size display of most mobile devices is maximized—highly relevant search results and offers are generally listed at the top of the list, ensuring that users get the relevant information and offers, and that merchant offers have a higher likelihood of redemption.

Figure 5:
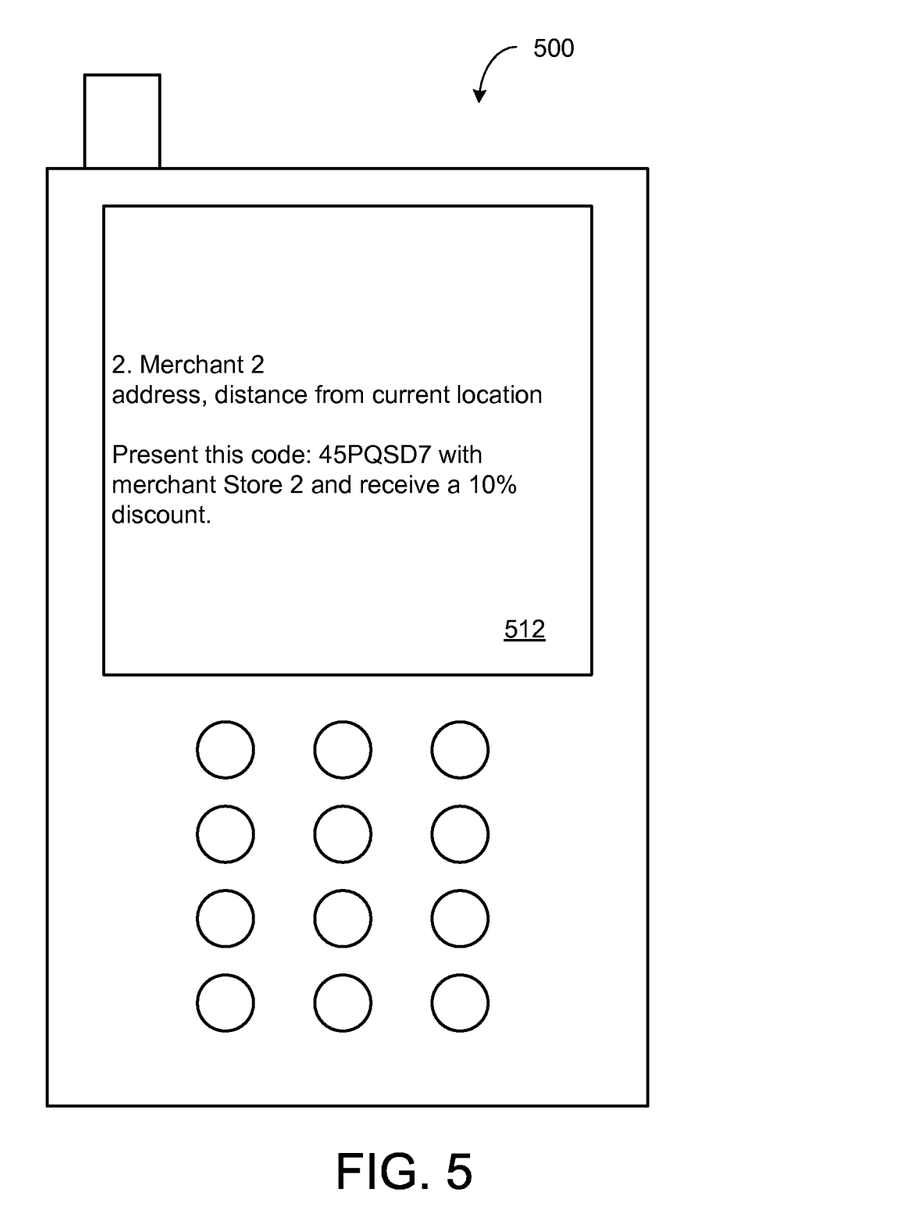
FIG. 5 illustrates a display according to some embodiments.

Referring now to FIG. 6, another mobile device 500 is shown with a display 512 that shows details for a particular merchant. The details may include information such as the merchant name, the merchant address, and a distance from the current location. In some embodiments, the detailed display 512 may include a coupon or offer. For example the offer may include an offer code or identifier that when redeemed by the user at the offering merchant will provide a discount on services to the user.

The foregoing disclosure has been described with reference to specific exemplary embodiments thereof. It will, however, be evident that various modifications and changes may be made thereto without departing from the broader spirit and scope set forth in the appended claims.

What is claimed is:

1. A system comprising:
a processor;
a communication device coupled to the processor, the communication device in communication with a network; and
a medium storing instructions adapted to be executed by the processor to:
receive a search request from a user transmitted over said network;
determine at least one of a location of the user and a desired search location of the user;
determine a plurality of segments into which the user may be grouped, the plurality of segments being defined based on aggregated historical payment transaction data processed by a payment network for a plurality of users;
determine a search response based on: a user profile of the user, the aggregated historical payment transaction data defining the plurality of segments into which the user is grouped, and the at least one of a location of the user and a desired location of the user, wherein said user profile: is created based on data associated with a plurality of payment transactions previously conducted by the user and groups the user into at least one of the plurality of segments; and
send the search response, over said network, to a mobile device associated with the user.

2. The system of claim 1, wherein said search response includes information identifying at least a first merchant matching the search request and at least one offer.

3. The system of claim 1, wherein said plurality of payment transactions are transactions using a payment account associated with said user and registered in said system.

4. The system of claim 3, wherein said data associated with said plurality of payment transactions include data identifying a date of each transaction, a merchant category associated with each transaction, and an amount of each transaction.

5. The system of claim 1, wherein said user profile includes at least one purchase characteristic identifier associated with said user.

6. The system of claim 5, wherein said at least one purchase characteristic identifier is selected from a plurality of purchase characteristic identifiers characterizing a purchasing profile of said user.

7. The system of claim 6, wherein said purchasing profile of said user is derived from data identifying a plurality of historical transactions entered into by said user using a payment account.

8. The system of claim 1, wherein said user profile further includes preference data selected by said user.

9. The system of claim 8, wherein said preference data includes at least one of a location preference and a merchant category preference.

10. The system of claim 1, wherein the user profile comprises at least one of a category preference, information identifying user browsing habits, a location preference, and a saved search.

11. The system of claim 1, wherein the determining a location of the user comprises at least one of:
locating a latitude and longitude of the mobile device associated with the user by a global positioning system; and
receiving location preference record associated with said user.

12. The system of claim 1, wherein the determining a response comprises:
determining at least one merchant located within a predefined radius of the at least one of a location of the user and a desired search location of the user.

13. The system of claim 1, wherein sending the response comprises:
sending a response to a client application of said mobile device.

14. The system of claim 1, further comprising:
receiving, from said mobile device, a request for an offer code; and
transmitting, to said mobile device, the offer code.

15. A method comprising:
receiving a search request from a user transmitted over a network;
determining at least one of a location of the user and a desired search location of the user;
determining a plurality of segments into which the user may be grouped, the plurality of segments being defined based on aggregated historical payment transaction data processed by a payment network for a plurality of users;
determining a search response based on: a user profile of the user, the aggregated historical payment transaction data defining the plurality of segments into which the user is grouped, and the at least one of a location of the user and a desired search location of the user, wherein said user profile: is created based on data associated with a plurality of payment transactions previously conducted by the user and groups the user into at least one of the plurality of segments; and
sending the search response, over said network, to a mobile device associated with the user.

16. The method of claim 15, wherein said search response includes information identifying at least a first merchant matching the search request and at least one offer.

17. The method of claim 15, wherein said plurality of payment transactions are transactions using a payment account associated with said user.

18. The method of claim 15, wherein said user profile includes at least one purchase characteristic identifier associated with said user, wherein said at least one purchase characteristic identifier is selected from a plurality of purchase characteristic identifiers characterizing a purchasing profile of said user.

* * * * *